UNITED STATES PATENT OFFICE.

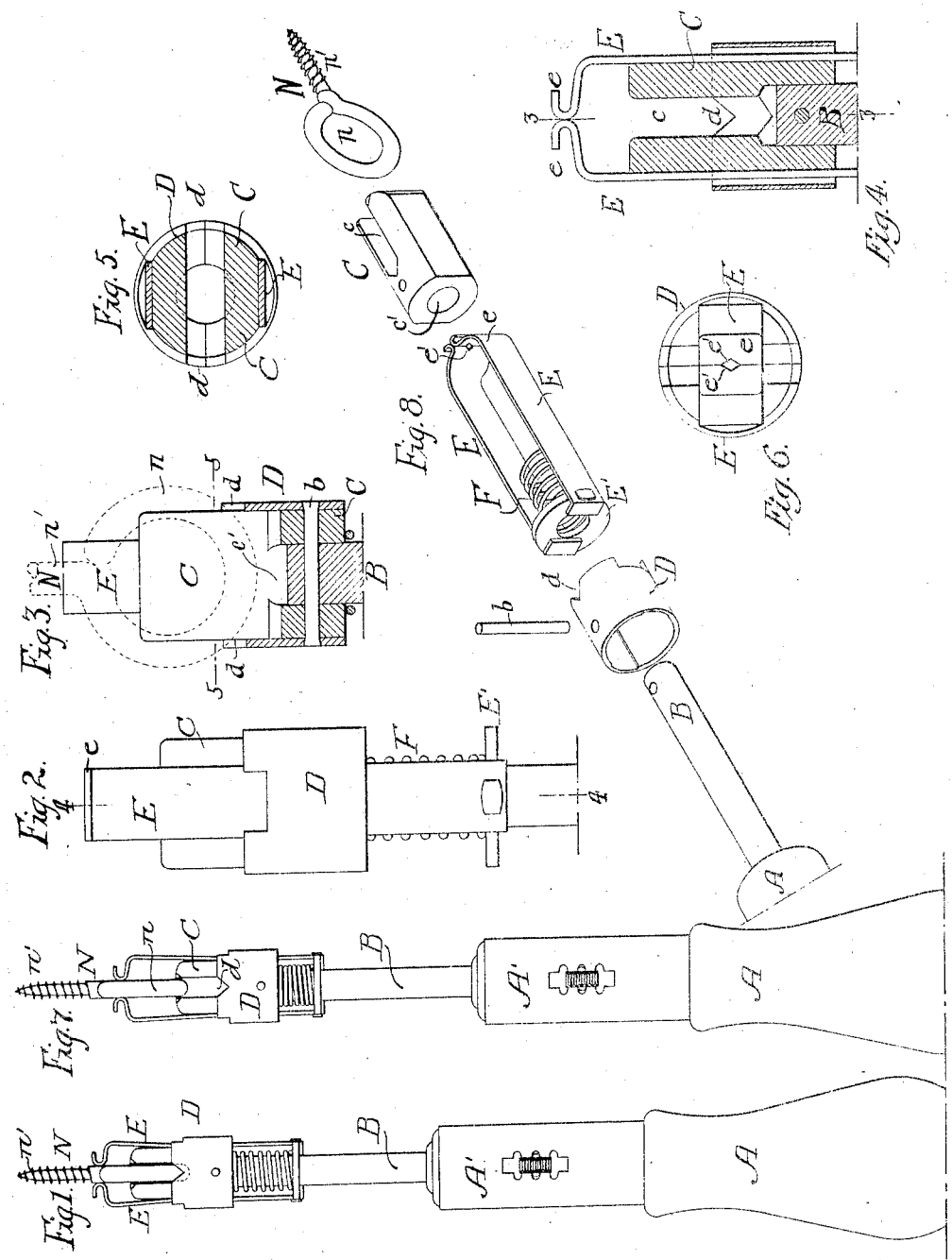

THOMAS J. FEGLEY, OF PHILADELPHIA, PENNSYLVANIA, ASSIGNOR TO NORTH BROS. M'F'G CO., OF PHILADELPHIA, PENNSYLVANIA, A CORPORATION OF PENNSYLVANIA.

SCREW-EYE DRIVER.

No. 882,937.   Specification of Letters Patent.   Patented March 24, 1908.

Application filed January 2, 1907. Serial No. 350,360.

*To all whom it may concern:*

Be it known that I, THOMAS J. FEGLEY, a citizen of the United States, residing in Philadelphia, Pennsylvania, have invented certain Improvements in Screw-Eye Drivers, of which the following is a specification.

My invention relates to certain improvements in means for attaching a screw eye to a screw driver so that the screw eye can be driven by the use of one hand and readily detached by simply withdrawing the driver when the screw eye is in place.

My invention is also applicable for the purpose of removing a screw eye when desired.

In the accompanying drawing: Figure 1, is a side view of my improved screw eye driver, showing the screw eye in place; Fig. 2, is an enlarged view of the head of driver; Fig. 3, is a sectional view on the line 3—3, Fig. 4; Fig. 4, is a sectional view on the line 4—4, Fig. 2; Fig. 5, is a sectional view on the line 5—5, Fig. 3; Fig. 6, is an end view; Fig. 7, is a view similar to Fig. 1, showing the jaws released so that the screw eye can be readily placed in position in the tool, and Fig. 8, is a perspective view, showing the parts detached.

A is the handle of the screw driver.

B is the shank and A' is ratchet mechanism which may be used in some instances but which is not necessary and forms no part of my invention as the shank may be rigidly secured to the handle in many cases.

Secured to the shank B is a head C, slotted at c for the reception of the eye portion n of the screw eye N. Surrounding the head C is a sleeve D; the two parts C and D being secured to the shank by a transverse pin b. The sleeve D has a V-groove d at each side alining with the slot c in the head C, but the slot is deeper than the grooves. The base of the slot has a central cavity c' and the base at each side of the cavity is V shaped. This construction enables me to seat the eye portion of the screw eye firmly in the head, the central cavity preventing a small eye resting directly on its end as there should be two bearing points to give the eye a rigid seat. On each side of the head are spring jaws E—E, which are secured to a ring E' in any suitable manner. These jaws pass between the head and the sleeve D, as clearly illustrated in the drawing, the head being flattened for this purpose, the sleeve holding the jaws and preventing them from turning independently of the head. Mounted between the head and the sleeve E' is a coiled spring F, tending to retract the sleeve and its spring jaws.

It will be noticed that the spring jaws are brought together at their extreme ends and slightly flared at e forming a grip for the shank portion n' of the screw eye and in order to center the screw eye I preferably notch the ends e at e', as clearly illustrated in Fig. 6.

The operation of the device is as follows: When it is desired to attach the screw eye to the driving tool the spring clamp is forced outwards by pressure, as indicated in Fig. 7, then the eye portion of the screw eye is forced in between the flared portions e of the spring jaws and into the slot c in the head C until the eye rests either in the V-grooves d in the sleeve or the V groove in the base, according to the size of the eye. Then the spring clamp is released and the spring F will retract this clamp until it assumes the position illustrated in Fig. 1. The ends e of the jaws bear firmly upon the shank of the screw eye; the sleeve preventing the spring jaws from spreading apart firmly holding a screw eye to the shank of the driver, the screw eye can then be readily screwed into position with one hand and released by simply pulling the driver away from the screw eye the spring jaws yielding under strain sufficiently to allow for the withdrawal of the driver leaving the screw eye in position. When it is desired to remove the screw eye, all that is necessary is to push the driver on to the eye of the screw, the springs will yield under the pressure and the eye will enter the slot in the driver and the jaws will grasp the screw eye at the shank, then by turning the screw driver in a reverse direction the screw eye will turn out of the opening and it can be readily detached from the driver by a quick pull.

My improved driver will fit any of the ordinary diameters of screw eyes and in thickness up to the width of the slot c. The base of the slot being V-shaped as well as the notches in the sleeve, the screw eye will be centered and held firmly either by resting in the V-shaped base of the slot in the head or in the V-shaped notches in the sleeve.

It will be understood that my invention may be applied to screw hooks as well as screw eyes.

It will be understood that a tool of this type is of great advantage in removing awnings, the screw eyes being generally in such a position that they are either applied or removed with considerable difficulty, but with my improved tool a screw eye can be readily applied or removed with the use of only one hand.

I claim:—

1. The combination in a screw driver, of a shank, a head on said shank recessed so as to be capable of engaging limited portions of opposite sides of a screw eye, a sleeve on the head and coöperating therewith to hold the screw eye, a sliding clamp having spring jaws capable of engaging the screw eye, and a spring for retracting the clamp, substantially as described.

2. The combination in a screw driver, of a shank, a head on the shank, a slot in the head, a sleeve mounted on the head and having V-grooves alining with the slot in the head, a clamp consisting of a ring having two spring jaws attached thereto extending on each side of the head, said jaws being arranged to clamp the shank of the screw eye, substantially as described.

3. The combination in a screw driver, of a shank, a head secured to the shank, said head being slotted, a sleeve surrounding the head and secured thereto, and having V-shaped notches alining with the slot in the head, a spring clamp consisting of a ring having two spring jaws extending between the head and the sleeve, and the ends of the jaws abutting and notched to center the shank of the screw eye, and a spring for retracting the jaws, substantially as described.

4. The combination in a screw driver, of a shank, a head slotted to receive the eye portion of the screw eye and constructed to engage limited portions of opposite sides of said eye, a sliding spring clamp having two jaws arranged to clamp and center the shank of the screw eye, and means for retracting the clamp, substantially as described.

5. The combination in a screw driver, of a shank, a head on the shank having V-shaped seats for the screw eye, and a pair of spring clamping jaws, substantially as described.

6. The combination in a screw driver, of a shank, a slotted head on the shank, the base of the slot being V-shaped at each side and having a central cavity, a sleeve surrounding the head having V-shaped notches, and spring jaws for clamping the shank of the screw eye, substantially as described.

7. The combination in a screw driver, of a shank, a slotted head, the base of the slot being V-shaped at each side of the center, a sleeve having V-shaped notches above the V-shaped base of the slot in the head, and spring jaws for clamping the shank of a screw eye, the eye portion resting in the slot in the head, substantially as described.

In testimony whereof, I have signed my name to this specification, in the presence of two subscribing witnesses.

THOMAS J. FEGLEY

Witnesses:
E. R. LOUGHERY,
WM. A. BARR.